Dec. 17, 1957    A. BYSTROM, JR., ET AL    2,817,086
ELLIPTICALLY POLARIZED ANTENNAS
Filed Sept. 27, 1954
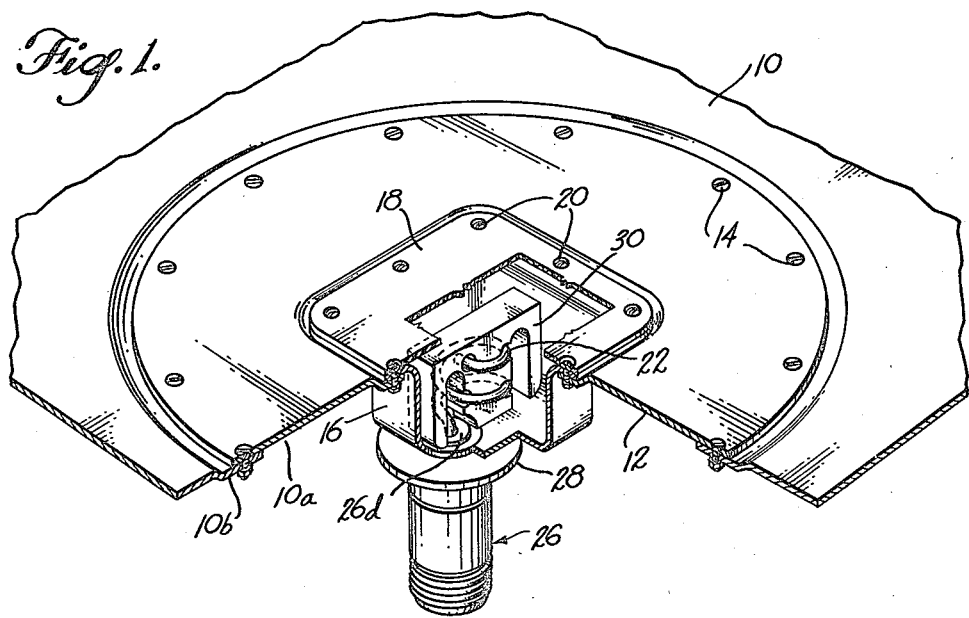
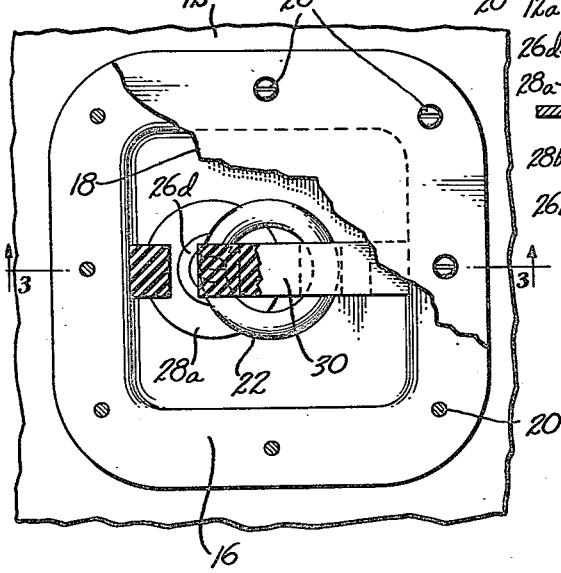
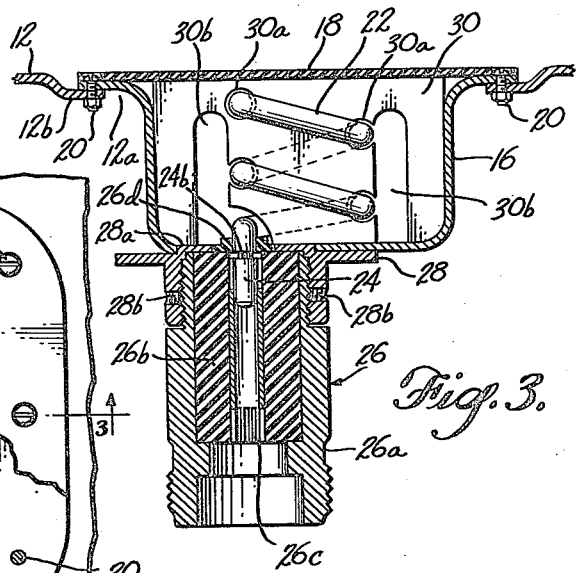
INVENTORS.
ALBIN BYSTROM, JR.
JOHN D. KELLY
BY
Reynolds, Beach & Christensen
ATTORNEYS

United States Patent Office 2,817,086
Patented Dec. 17, 1957

2,817,086

ELLIPTICALLY POLARIZED ANTENNAS

Albin Bystrom, Jr., and John D. Kelly, Seattle, Wash., assignors to Boeing Airplane Company, a corporation of Delaware Application September 27, 1954, Serial No. 458,374

6 Claims. (Cl. 343—895)

This invention relates to improvements in elliptically polarized antennas and more particularly in those of the helical conductor type. The invention is herein illustratively described by reference to its presently preferred form as applied to aircraft. It will be appreciated, however, that certain modifications and changes with respect to details may be made therein without departing from the scope of the inventive subject matter.

Elliptically polarized antennas can be used to transmit or receive electromagnetic waves of various angles of polarization as well as most elliptically polarized waves. It is desirable in most instances that the antenna have a wide frequency band of response. In aircraft applications it is important that such antennas be flush-mounted, with no elements or coverings projecting beyond the contour of the skin of the aircraft. Furthermore, it is important in such applications that the antenna be compact and of lightweight construction, yet sufficiently rugged to withstand any shocks or vibrations which may occur in the operation of the aircraft of a nature tending to disturb the spacing between positionally related antenna elements.

It was previously learned that most of the important requirements for such elliptically polarized antennas in aircraft applications could be satisfied by the mounting of a helical-conductor antenna element in a cup-like electrically conductive cavity opening outwardly and covered with a dielectric window mounted flush with the aircraft skin. At first it was believed that the cavity should be of large breadth and width in terms of electrical wave lengths, so as to simulate approximately an infinite ground plane. It was subsequently found, however, that generally satisfactory space field patterns were achievable with a relatively small cavity having breadth and width dimensions of the order of slightly more than half an electrical wave length measured perpendicular to the helix axis. Such cavity-mounted helical antennas can be made to exhibit the desirable characteristics of helical antennas mounted on ground planes, while being much more simple and compact.

An essential measure of the efficiency of a helical antenna for its intended purpose for applications of present interest is its so-called "axial ratio." This term may be defined as the arithmetic ratio of the maximum to the minimum of the antenna field components measured on the helix axis in directions transverse to such axis. In physical terms such components constitute a measure of the intensity effect of the antenna field on lineally polarized antennas oriented respectively in the directions of polarization of the two orthogonally related components mentioned above. While the electrical characteristics and radiation patterns of cavity-mounted helical antennas of former designs were generally satisfactory, a problem was presented in preventing the axial ratio from exceeding an allowable maximum, while maintaining the desired field pattern and electrical characteristics throughout the required frequency band. The axial ratio of a helical antenna is determined in part by the helix conductor diameter. In general, the axial ratio increases with increase of helix conductor diameter for a given helix mean diameter and surrounding cavity size. Varying the number of helix turns while containing the helix entirely within the cavity has little effect on axial ratio. The attainment of a sufficiently low axial ratio is not always possible with the former basic cavity-mounted helical antenna, since use of a relatively large helix conductor diameter was required for achieving mechanical rigidity, desired impedance characteristics and acceptable voltage gradients and power losses.

The present invention is directed to the provision of a cavity-mounted helical antenna having a relatively low axial ratio throughout a wide frequency band.

A related object is such an antenna of relatively simple, lightweight construction wherein positionally related elements are conveniently supported in fixed positional relationship.

Still another object of the invention is an antenna of the type described which is readily adapted for meeting specific electrical design requirements including broad band impedance matching requirements, and furthermore which will exhibit a space field or radiation pattern not appreciably different than that presented by a simple cavity-mounted helical antenna of the former type of construction.

In accordance with the present invention, the axial ratio of a cavity-mounted helical antenna of the last-mentioned type is materially reduced by the provision of dielectric insert means so shaped and disposed in relation to the helix within the cavity that the electrical phasing of one of the two orthogonally related field components is correctively adjusted relative to that of the other such component along the path of energy propagation in the cavity lengthwise of the helix. As herein disclosed, such a dielectric insert means comprises a plate or slab of low-loss dielectric material generally disposed along a longitudinal diametral plane of the helix and extending across the full width of the cavity in the direction of polarization of that field component which when advanced in its electrical phasing relative to the orthogonally related component will provide the desired reduction of antenna axial ratio throughout the frequency band of interest. The thickness of the dielectric insert slab is not especially critical but must be sufficient to have effect over an appreciable frequency band yet not nearly approach the width of the guide and thereby lose its directional polarization selectively. A thickness of approximately one-fifth the internal width of the cavity is about optimum in a typical case. Preferably the dielectric insert slab is provided on opposite sides with alternately positioned holes or openings in which the turns of antenna helix conductor may be physically supported. In assembled relationship the components are preferably cemented together and to the cavity walls for preserving positional relationships.

The electrical impedance effect of the dielectric insert may be changed without seriously affecting the axial ratio or space pattern of the antenna by longitudinal slotting of the insert lengthwise of the helix in the region exterior to the helix. Preferably the dielectric insert extends the full length of the cavity, thus furnishing maximum support to the helix and producing maximum effect on the axial ratio.

These and other features, objects and advantages of the invention will become more fully evident from the following description by reference to the accompanying drawings.

Figure 1 is a perspective view of the improved antenna with parts broken away to show internal details.

Figure 2 is a front view of the antenna installation with parts broken away to reveal internal details.

Figure 3 is a longitudinal sectional view taken on line 3—3 in Figure 2.

The airplane fuselage skin 10 has a circular aperture 10a at a suitable location for the recessed mounting of the elliptically polarized antenna. The airplane skin is formed with a recessed rim flange 10b surrounding the aperture for the flush mounting of a circular plate 12 covering such aperture. Screws and nuts 14 are conveniently employed to secure the plate in such position overlapping the flange 10b. A central rectangular opening 12a is formed in the plate 12 and is surrounded by a recessed flange 12b which serves as the peripheral support for the outwardly opening cup-like conductive member 16 forming the antenna cavity. A flush-mounted dielectric cover plate 18 serving as a radome or electromagnetically transparent window is conveniently secured by cement to the outwardly turned flange on the cavity member 16. Such flange overlaps the recessed flange 12b and is secured thereto as by screws and nuts 20 as shown.

In the example the elliptically polarized antenna element cooperating with the outwardly facing cavity member 16 to provide the desired space field pattern comprises the two-turn helical conductor 22 mounted wholly within the cavity in such a position and attitude that the helix axis coincides with the cavity axis perpendicular to the plane of the window or cover plate 18. Preferably the helical-antenna conductor is mechanically supported and electrically energized by a conductor 24 extending parallel to the helix axis directly from a point on the helix periphery rather than radially of the helix from such a point. The conductor 24 constitutes an extension of the central conductor of a coaxial transmission line coupling unit 26 adapted in a typical case for connection to the coupling element of a standard 50-ohm coaxial line. The coupling unit 26 comprises the shell 26a threaded into the mounting socket 28 which is suitably secured as by brazing or silver soldering to the bottom or end wall of the cavity member 16 as shown. Socket 28 is provided with set screws 28b which may be advanced against the sides of the shell 26a to prevent relative rotation between such shell and the socket. Socket 28 has an upturned cylindrical portion 28a which fits snugly within an eccentric circular aperture in the cavity member bottom, which aperture is concentric to the conductor 28 as shown.

A tubular insulating bushing 26b received within the shell 26a serves as a support for the central tubular conductor 26c. The lower or outer end of the conductor 26c is slotted lengthwise to form spring fingers between which the end of the central conductor of a coaxial line coupling is slidably inserted to be gripped thereby when a coaxial line connection is made to the unit 26. The opposite end of the tubular member 26c is likewise slotted to form fingers. These fingers contact the conductor 24 directly beneath the impedance matching peripheral groove 24b formed around such conductor 24. Thus, the conductor 24 by which the helical antenna element is supported and energized is firmly gripped and held by the conductive tube 26c which in turn is held by the insulating bushing 26b within the coupling element 26a. A second insulating bushing 26d on the inner (cavity) end of the bushing 26b snugly encircles the conductor 24 and in turn is received in a retaining aperture in the base of the socket member 28. A portion of the bushing 26d projects into the cavity 16 directly beneath the lower end of the helix and serves as a spacer holding the helix conductor at predetermined spacing from the inside face of the cavity member bottom. The amount of spacing is selected to minimize the possibility of electric arcing and to furnish the desired electrical impedance transformation characteristics between helical antenna and coaxial line coupling as later described.

Additional support for the conductor 22 is provided by the dielectric insert plate 30 received within the cavity member 16. As previously mentioned the plate 30 has the primary purpose of improving, i. e. reducing, the axial ratio of the elliptically polarized antenna. Such plate, formed of low-loss dielectric material, is disposed within the cavity member 16 in a general plane containing the axis of the helix, and extends across the full width and depth of the cavity member. Preferably the dielectric insert plate 30 extends in a plane which constitutes that diametral plane of the helix at which the helix conductor terminates. The thickness of the dielectric insert plate is not critical but preferably is of the order of one-half the internal diameter of the helix where the dielectric constant of the material used is about 2.5. If it is too thick it loses its polarization selectivity, whereas if it is too thin its effect, though directionally selective as far as polarization is concerned, is inadequate. Apertures 30a formed in the insert plate on opposite sides of the helix axis are located to receive opposite sides of the turns of the helical conductor. The latter is inserted through these apertures by rotation, rotated in a sense to advance the helix along the plate cork-screw fashion.

Slots 30b are formed longitudinally in the dielectric insert plate 30 outside the helix to impart, by their width and length, the desired effect on the electrical impedance properties of the composite antenna as more fully explained hereinafter. The slots 30b extend from the lower edge of the insert plate 30 (i. e. that edge lying in contact with the bottom of the cavity member 16) to corresponding points situated near the opposite edge of the insert plate.

Preferably the insert plate 30 is cemented to the helical conductor and to the cavity walls, as well as to the inner face of the cover plate 18. Thus, the dielectric insert 30 provides rigid support for the helical-antenna conductor in a given positional relationship to the cavity walls.

The cavity member 16 is illustrated in the form of a square receptacle having a depth somewhat less than its width and breadth. Such cavity functions generally as a wave guide in which electromagnetic radiation propagates in a direction lengthwise of the helix. Preferably the cavity member 16 has an internal size of the order of slightly more than one-half an electrical wave length of the highest frequency of energy within the intended operating frequency band width of the antenna. This dimensional requirement is observed in order to obtain the desired propagational mode in the cavity. The cavity need not be square; it may be found or have other cross-sectional shapes which are capable of sustaining energy propagation in the manner of a wave guide. The cavity depth is not critical and is controlled primarily by the length of the helix to be contained therein.

The helical coil diameter is chosen to represent a substantial fraction such as of the order of one-half of the cavity width or diameter. The factors governing choice of helix diameter are known. Preferably the helix conductor diameter is approximately one-fifteenth of the mean helix coil diameter. The choice of helix conductor diameter affects the axial ratio of the antenna, the antenna impedance, efficiency, power level and mechanical aspects of design. Minimum energy reflection from the transition between the helical conductor and the coaxial line extension conductor 24 is achieved by the expedient of gradually reducing the helix pitch as the helical conductor approaches the supporting conductor 24. In effect, the progressively decreasing slope of the end of the helix relative to the bottom of the cavity member 16 as the helical conductor approaches the feed conductor 24 provides an impedance transformation which approximately matches the helical conductor impedance to the transmission line impedance at the point of feed of the helical conductor, as an antenna element. In a typical case the pitch of the helix at the point of connection to the conductor 24 is of the order of 2½° to 5°, and gradually merges into a helix pitch of the order of 12° in a small fraction of a turn of the helix conductor.

The helix pitch angle chosen affects the antenna size and radiation pattern characteristics according to known considerations.

The number of helix turns in the antenna element 22 is not regarded as particularly critical from the standpoint of radiation pattern. However, the number of helix turns tends to affect the frequency response characteristics of the antenna. It was found in that regard that an antenna having a two-turn helix was quite satisfactory in that the major and minor axes of the polarization ellipse (measured in any plane perpendicular to the antenna axis and at the intersection of such plane and axis) remained fairly constant in terms of angular position thereof about the antenna axis, over the entire frequency band of interest, and thereby enabled the dielectric insert plate 30 to function in its intended capacity for minimizing the axial ratio of the antenna space field pattern as previously explained. The dielectric insert plate 30 appears to achieve the observed results in a rather complex manner not readily analyzed in theory. The plate affects both the electrical wave length in the cavity for the field component lying generally in the plane of the plate, and influence the original generation of the cavity modes by virtue of its disposal along the length of the helix conductor itself. Thus by its dual effect of influencing generation of cavity fields and shifting the phase of the propagating field energy the dielectric insert plate provides a definite improvement in the axial ratio of the antenna.

Broad band impedance matching of the composite antenna to a coaxial transmission line such as the standard 50-ohm line is affected by the slots 30b without disturbing the radiation pattern. The slotting or other shaping of the dielectric insert member within the helix core does not appear to influence appreciably the antenna impedance nor the radiation pattern produced. Some compromise is involved in the use of slots 30b for impedance matching, since the slots do affect the ability of the insert plate to effect a reduction of axial ratio. In a typical case the following comparative results were achieved as a function of varying excitation frequency.

| Frequency (normalized) | Axial ratio, db | | |
|---|---|---|---|
| | Case 1 | Case 2 | Case 3 |
| 1.00 (low end of frequency band) | 5.2 | 3.7 | 4.4 |
| 1.13 | 4.6 | 1.2 | 4.4 |
| 1.27 | 5.6 | 3.6 | 3.8 |
| 1.41 (high end of frequency band) | 6.8 | 3.2 | 3.5 |

Case 1 represents the results of an antenna without dielectric insert plate; case 2 the results with what may be regarded as an optimum design of the insert plate from the standpoint of axial ratio alone; and case 3 the results with a compromise design of insert plate (slotted) considering not only space field patterns but also antenna impedance.

The notable improvements achieved electrically and mechanically in a cavity mounted helical antenna by the provision of dielectric insert means as disclosed will be evident to those familiar with the problems surrounding development of basic cavity mounted helical antennas in the past.

We claim as our invention:

1. Elliptically polarized antenna means comprising a cavity-forming member having an electrically conductive bottom wall, electrically conductive side walls and an open end facing in the direction for electromagnetic wave energy propagation, an electrical conductor formed generally as a helix mounted within said cavity with the helix axis disposed substantially normal to said bottom wall, the transverse dimensions of said cavity being of the order of slightly more than one-half an electrical wavelength of electromagnetic wave energy propagation therein, transmission line coupling means connected to said helical conductor through a wall of said cavity for energization of said conductor as an antenna element, and dielectric insert means operatively disposed within said cavity for reducing the axial ratio of said elliptically polarized antenna, said dielectric insert means being formed and arranged in said cavity to provide a body of dielectric material extending generally along the length of said helix in a diametral plane thereof and of a thickness transverse to said plane materially less than the cavity width in the direction of such thickness, and including portions situated between opposite exterior sides of said helix and the respectively adjacent side walls of said cavity.

2. The elliptically polarized antenna means defined in claim 1, wherein the dielectric insert means comprises a plate of dielectric substance extending substantially across a width dimension of the cavity along a diametral plane of the helix, said plate having apertures therein through which the coils of said helix pass.

3. The elliptically polarized antenna defined in claim 2, wherein the plate is slotted depthwise of the cavity at a transverse location between the helix exterior and the adjacent cavity side wall.

4. The elliptically polarized antenna defined in claim 3, wherein the plate is bonded to at least one cavity wall and to the helical conductor for rigidly supporting said conductor in its established positional relationship to the cavity.

5. Elliptically polarized antenna means comprising a cavity-forming member having an electrically conductive bottom wall, electrically conductive side walls and an open end facing in the direction for electromagnetic wave energy propagation, an electrical conductor formed generally as a helix mounted within said cavity with the helix axis disposed substantially normal to said bottom wall, the transverse dimensions of said cavity being of the order of slightly more than one-half an electrical wave-length of electromagnetic wave energy propagation therein, transmission line coupling means connected to said helical conductor through a wall of said cavity for energization of said conductor as an antenna element, and dielectric insert means substantially extending across a width dimension of said cavity and along the length of said helix generally in an axial plane thereof, the thickness of said insert means being a minor fraction of the cavity width measured transversely to said axial plane.

6. Elliptically polarized antenna means comprising a helical antenna element mounted substantially coaxially within a generally cylindrical cavity-forming wave guide member electrically closed at one end and open at its opposite end for passage of electromagnetic radiation therethrough emitted or received by said helical antenna element, said cavity having width dimensions of the order of slightly more than one-half electrical wave length for sustaining a mode of energy propagation therein involving orthogonally related field components, wave energy transmission means coupled to said helical antenna element, and dielectric insert means disposed lengthwise of said helix in the space between an exterior side thereof and the adjacent cavity side, said dielectric insert means having a thickness, measured generally peripherally of said helix, constituting a minor fraction of the corresponding width dimension of said cavity.

References Cited in the file of this patent

UNITED STATES PATENTS

| 2,431,124 | Kees et al. | Nov. 18, 1947 |
| 2,635,190 | Riblet et al. | Apr. 14, 1953 |

OTHER REFERENCES

Proc. I. R. E., vol. 36, No. 10, October 1948 (Fig. 4 and Fig. 5, page 1238 relied upon).